Jan. 4, 1944.   G. H. AKLIN   2,338,614
LENS
Filed June 17, 1942   2 Sheets-Sheet 1

| F = 100 mm | | | | APERTURE = f/4.5 |
|---|---|---|---|---|
| LENS | $N_D$ | V | RADII | THICKNESSES |
| I | 1.744 | 45.8 | $R_1 = +33.2$ mm<br>$R_2 = -133.7$ | $t_1 = 5.8$ mm<br>$S_1 = 1.4$ |
| II | 1.629 | 35.3 | $R_3 = -64.9$<br>$R_4 = +38.6$ | $t_2 = 1.5$<br>$S_2 = 5.2$ |
| III | 1.629 | 35.3 | $R_5 = -60.3$<br>$R_6 = +48.0$ | $t_3 = 1.5$<br>$S_3 = 1.5$ |
| IV | 1.744 | 45.8 | $R_7 = +77.8$<br>$R_8 = -39.8$ | $t_4 = 5.8$<br>BF = 89.2 |

GEORGE H. AKLIN
INVENTOR
BY
ATT'Y & AG'T

Jan. 4, 1944.　　　G. H. AKLIN　　　2,338,614
LENS
Filed June 17, 1942　　2 Sheets-Sheet 2

GEORGE H AKLIN
*INVENTOR*
BY
ATTY & AGT

Patented Jan. 4, 1944

2,338,614

UNITED STATES PATENT OFFICE 2,338,614

LENS

George H. Aklin, Rochester, N. Y., assignor to Eastman Kodak Company, Rochester, N. Y., a corporation of New Jersey Application June 17, 1942, Serial No. 447,337

9 Claims. (Cl. 88—57)

This invention relates to lens systems and particularly to photographic objectives of the type comprising four airspaced elements.

The object of the invention is to provide a rapid anastigmatic photographic objective which is economical to manufacture and with improved correction of zonal spherical aberration, astigmatism and spherical aberration of the oblique pencils of rays.

In the well known class of photographic objective consisting of two negative lens elements spaced between two positive elements there may be distinguished at least three more or less distinct types. The first was derived from the Petzval portrait lens by making both halves of the lens of two elements with airspaces between them and arranging them with the negative lenses facing each other. This type, first taught in U. S. 1,620,337, Frederick and Altman, is in general characterized by having a central airspace longer than about one-sixth of the focal length of the objective or longer than about 3.5 times the sum of the other two airspaces or both. It is also characterized by weaker powers of the elements, the total power of the positive elements usually being less than about three times the power of the objective. This type is especially suitable for a very large aperture and a comparatively small field as the Petzval sum is not corrected. A recent modification of this type is shown in U. S. 2,158,179, Frederick and Aklin.

The second type, to which type this invention primarily relates, was derived from the double anastigmat by separating the elements of each half or in some cases from the Cooke triplet by dividing the negative component into two simple negative elements. The Petzval sum is usually corrected, the total power of the positive elements being between three and ten times the power of the objective and the total power of the negative elements being between 0.7 and 1.2 times that of the positive elements. Both the first two types are further characterized by the outer two lenses being biconvex with their outer surfaces more strongly curved. This second type is economical to manufacture and is widely favored for process work and general photography.

The third type is characterized by meniscus shaped elements concave toward the diaphragm which is centrally located. This type is adaptable to wide angle work at apertures about f/6.3, but the present invention is only concerned with the second type.

According to the present invention a lens of the second of these three types is made with the average index of the negative elements less than that of the positive elements by more than 0.08. Preferably the power of the positive elements totals less than seven times the power of the objective and both negative elements turn their stronger surfaces toward the rear of the objective.

In one of the earliest examples of this type of objective the index of the negative elements was considerably lower than that of the positive elements. The full advantages of this feature were not realized at that time—the difference in index being less than that required by the present invention.

Furthermore, the trend during the intervening forty years has been in exactly the opposite direction so that lenses of this type that have been made have had for the most part nearly equal indices in the negative and positive elements.

I have found, however, that a large difference in index, about 0.08 or more, is effective in reducing the astigmatism for the intermediate zones of the field and especially in reducing the primary curvature for the outer portion of the field, that is the portion beyond the node in the field curve.

This feature is especially advantageous when combined with the feature of weaker powers of the several elements and with an unsymmetrical arrangement whereby the stronger surfaces of the negative elements are turned toward the rear or short conjugate side of the objective. These points of structure when combined with the index difference already mentioned aid in improving the zonal spherical aberration and the spherical aberration of the oblique pencils of rays.

Furthermore, the specific combination of glasses used is of general advantage in any of the three types of four piece air spaced lenses defined above.

The constructional data are as follows:

| Lens | $N_d$ | V | Radii | Thicknesses |
|---|---|---|---|---|
| | | | $f=100$ mm. | Aperture—f/4.5 |
| I | 1.744 | 45.8 | $R_1=+33.2$ mm. | $t_1=5.8$ mm. |
| | | | $R_2=-133.7$ | $s_1=1.4$ |
| II | 1.629 | 35.3 | $R_3=-64.9$ | $t_2=1.5$ |
| | | | $R_4=+38.6$ | $s_2=5.2$ |
| III | 1.629 | 35.3 | $R_5=-60.3$ | $t_3=1.5$ |
| | | | $R_6=+48.0$ | $s_3=1.5$ |
| IV | 1.744 | 45.8 | $R_7=+77.8$ | $t_4=5.8$ |
| | | | $R_8=-39.8$ | B.F.=89.2 |

This example has a central airspace shorter than one-sixth of the focal length and also shorter than 3.5 times the sum of the other two airspaces. The powers of the positive elements are 2.8/f for each, which totals more than 3/f for both where 1/f is the power of the complete objective. Each of these features serves to distinguish from the Petzval and modified Petzval types of lenses.

The outer two elements are biconvex, which distinguishes this lens from the wide angle type. The outer surfaces of these elements are more strongly curved and the powers of the negative elements are about 2.6/f and 2.4/f respectively which totals between 0.7 and 1.2 times the total power (5.6/f) of the positive elements. These features are characteristic of the second of the three types.

In accordance with the invention, the index of the negative elements is less than that of the positive elements by 0.115, the power of the positive elements totals 5.6/f, and the negative elements turn their stronger surfaces, $R_4$ and $R_6$ respectively, toward the rear or short conjugate side of the objective.

Figures 1, 2:
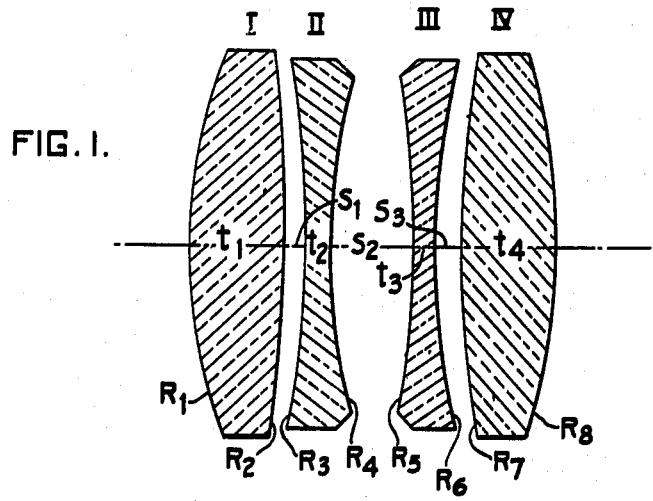
Fig. 1 shows an objective according to the invention.
Fig. 2 shows the constructional specifications for Fig. 1.
Figure 3:
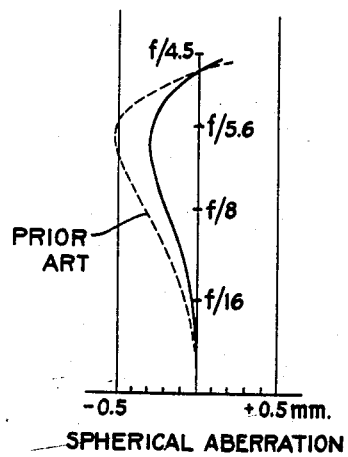
Fig. 3 shows the spherical aberration curves for this lens.
Figure 4:
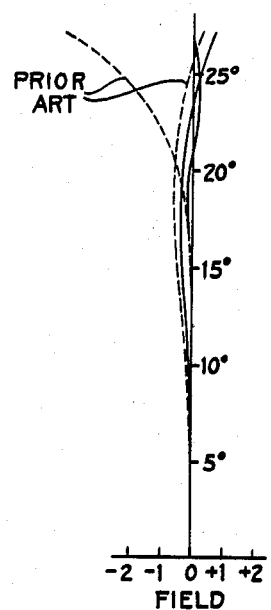
Fig. 4 shows the field curves for this lens.
Figure 5:
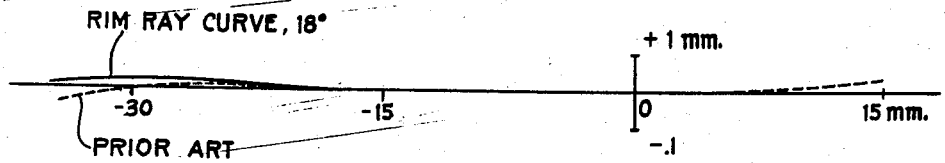
Fig. 5 shows the rim ray agreement curves at 18° for this lens.

Figs. 3, 4 and 5 show respectively the spherical aberration, field and rim ray curves at 18° from the axis for this lens compared with the best prior art whose curves are given as broken lines in each figure. It will be noted that the present invention gives greatly improved spherical aberration and an extremely flat field. Even the rim ray curve is slightly better than the prior art but this aberration was already practically negligible. The important point is that the rim ray correction was not spoiled when the high correction of field and spherical aberration were obtained. The invention giving these advantages is not limited to the above structure, but is of the scope of the appended claims.

According to a slightly different manner of expressing the relationship between the several surface curvatures, it is advantageous that the numerical sum of the curvatures of the surfaces of the positive elements be less than eight times the reciprocal of the focal length of the objective. A ratio smaller than eight is advantageous in producing a better covering power which is to say a flat field over a larger angle from the axis. It is likewise advantageous that the numerical sum of the curvatures of the surfaces of the negative elements should be larger in absolute value than the like sum for the positive elements. This relationship is advantageous in reducing the astigmatism on both sides of the field node. It is noteworthy that while several examples of the earlier art show one or the other of these features, thus obtaining either a reduction of the astigmatism with a concomitant narrowing of the field or a wider covering power accompanied by worse astigmatism, no lens of this type has heretofore combined both of these features as does the present invention resulting in the remarkably flat field and small astigmatism over an exceptionally wide angular field as shown in Fig. 4.

It will also be noted that the spherical aberration as shown in Fig. 3 is greatly improved. Even the oblique spherical aberration as indicated by the rim ray curve in Fig. 5 is slightly better than the prior art, but this aberration was already practically negligible. This figure represents a pencil of rays striking the front of the lens at an inclination of 18° below the axis. The abscissa shows the axial intercept of the incident ray and the ordinate shows the intercept of the emerging ray in the focal plane. As shown, the lower rim ray is on the left.

The invention giving these advantages is not limited to the above structure, but is of the scope of the appended claims.

I claim:

1. A photographic objective of the type consisting of four coaxially spaced lens elements of which the outer two are biconvex with their outer surfaces more strongly curved and with a total power between three and ten times the power of the objective and the inner two are negative with a total power between minus 0.7 and minus 1.2 times that of the positive elements characterized by the average refractive index of the negative elements being less than that of the positive elements by more than 0.08.

2. An objective according to claim 1 in which the total power of the positive elements is less than seven times that of the objective and the central airspace is shorter than one-sixth of the focal length of the objective.

3. An objective according to claim 1 in which the negative elements have their stronger surfaces facing toward the rear of the objective.

4. An objective according to claim 1 in which the central space is less than 3.5 times the sum of the other two spaces.

5. An objective according to claim 1 in which the central space is less than one-sixth of the focal length of the objective and less than 3.5 times the sum of the other two spaces, the total power of the positive elements is less than seven times that of the objective, and the rear surface of each negative element is stronger than the front surface.

6. A photographic objective having substantially the following specifications:

| Lens | $N_d$ | V | Radii | Thicknesses |
|---|---|---|---|---|
| I | 1.74 | 46 | $R_1=+0.33f$ | $t_1=0.06f$ |
| | | | $R_2=-1.34f$ | $s_1=0.01f$ |
| II | 1.63 | 35 | $R_3=-0.65f$ | $t_2=0.015f$ |
| | | | $R_4=+0.39f$ | $s_2=0.05f$ |
| III | 1.63 | 35 | $R_5=-0.60f$ | $t_3=0.015f$ |
| | | | $R_6=+0.48f$ | $s_3=0.015f$ |
| IV | 1.74 | 46 | $R_7=+0.78f$ | $t_4=0.06f$ |
| | | | $R_8=-0.40f$ | | where the first column gives the lens elements in Roman numerals in order from front to rear and indicates air spaces by dashes and where f is the focal length of the objective, $N_D$ is the index of refraction for the D line of the spectrum, V is the dispersive index, R, t, and s refer respectively to the radii of curvature of the refractive surfaces, the thicknesses of the elements, and the air spaces between the elements, the subscripts on these refer to the surfaces, the elements, and the spaces numbered consecutively from the front, and the + and — signs in the fourth column correspond to surfaces which are respectively convex and concave to the front.

7. A photographic objective according to claim 1 in which the negative elements have indices of refraction between 1.6 and 1.7 and dispersive indices between 30 and 40 and the positive elements have indices of refraction between 1.68 and 1.76 and dispersive indices between 45 and 47.

8. An objective according to claim 1 in which the numerical sum of the curvatures of the surfaces of the positive elements is less than the like sum for the negative elements and is also less than eight times the reciprocal of the focal length of the objective.

9. An objective according to claim 1 in which the numerical sum of the curvatures of the surfaces of the positive elements is less than the like sum for the negative elements and is also less than eight times the reciprocal of the focal length of the objective and in which the negative elements have their stronger surfaces facing toward the rear of the objective.

GEORGE H. AKLIN.